(12) United States Patent
Kang et al.

(10) Patent No.: US 9,381,943 B2
(45) Date of Patent: Jul. 5, 2016

(54) B-PILLAR UNIT FOR VEHICLE

(71) Applicant: Hyundai Motor Company, Seoul (KR)

(72) Inventors: Kyung Bum Kang, Gyeonggi-do (KR); Huen Sick Min, Gyeonggi-do (KR); Jeong Min Cho, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/658,979

(22) Filed: Mar. 16, 2015

(65) Prior Publication Data

US 2016/0152274 A1 Jun. 2, 2016

(30) Foreign Application Priority Data

Dec. 1, 2014 (KR) .................. 10-2014-0169942

(51) Int. Cl.
*B62D 25/04* (2006.01)
*B62D 21/15* (2006.01)

(52) U.S. Cl.
CPC ............. *B62D 21/157* (2013.01); *B62D 25/04* (2013.01)

(58) Field of Classification Search
CPC ..... B62D 23/00; B62D 25/025; B62D 21/157
USPC .................. 296/187.12, 193.06, 209, 203.02, 296/203.03
See application file for complete search history.

(56) References Cited

U.S. PATENT DOCUMENTS

| | | | | |
|---|---|---|---|---|
| 5,213,386 A * | 5/1993 | Janotik | ............... | B62D 23/005 280/785 |
| 5,671,968 A * | 9/1997 | Masuda | ............... | B62D 21/157 296/187.12 |
| 6,073,992 A * | 6/2000 | Yamauchi | ............... | B62D 23/00 296/187.12 |
| 6,623,067 B2 * | 9/2003 | Gabbianelli | ......... | B62D 23/005 296/203.01 |
| 6,843,525 B2 * | 1/2005 | Preisler | ............... | B62D 25/2054 296/184.1 |
| 6,948,768 B2 * | 9/2005 | Corcoran | ............ | B21D 26/033 296/190.08 |
| 6,957,845 B2 * | 10/2005 | Rager | .................. | B62D 23/005 296/146.9 |
| 7,237,832 B2 * | 7/2007 | Saeki | ................... | B62D 21/157 296/193.06 |
| 2010/0327630 A1 * | 12/2010 | Klimek | ................. | B62D 25/04 296/203.03 |
| 2011/0163571 A1 * | 7/2011 | Furusako | ............... | B62D 25/06 296/193.06 |
| 2014/0346816 A1 * | 11/2014 | Craig | ................... | B62D 25/025 296/203.03 |
| 2015/0042125 A1 * | 2/2015 | Bruggemann | ....... | B62D 25/025 296/187.12 |

FOREIGN PATENT DOCUMENTS

| | | |
|---|---|---|
| CN | 202283939 U | 6/2012 |
| EP | 1 153 824 A2 | 11/2001 |
| JP | 2005-075263 A | 3/2005 |
| JP | 2013-193637 A | 9/2013 |
| KR | 10-2011-01116719 A | 10/2011 |
| WO | 2012-105716 A1 | 8/2012 |

* cited by examiner

*Primary Examiner* — Pinel Romain

(74) *Attorney, Agent, or Firm* — Mintz Levin Cohn Ferris Glovsky and Popeo, P.C.; Peter F. Corless

(57) ABSTRACT

A B-pillar unit for a vehicle is provided. The B-pillar unit includes a B-pillar that is connected to a vehicle body. In particular, the B-pillar includes a roof surface, a left surface, a right surface and a floor surface that are connected in a substantially circular shape.

10 Claims, 3 Drawing Sheets

B-PILLAR UNIT FOR VEHICLE

CROSS-REFERENCE TO RELATED APPLICATION

The present application claims priority to Korean Patent Application No. 10-2014-0169942, filed Dec. 1, 2014, the entire contents of which is incorporated herein for all purposes by this reference.

BACKGROUND (a) Technical Field

The present invention relates to a B-pillar unit for a vehicle, and more particularly, to a B-pillar unit for a vehicle which is not connected through a welding by improving a conventional B-pillar unit for a vehicle where a welding part is ruptured when a side collision of a vehicle occurs.

(b) Description of the Related Art

Generally, a B-pillar is used on a vehicle body to reinforce rigidity of a vehicle. The various components of the B-pillar absorb impact caused from a side collision by being deformed at an initial stage of the side collision.

As shown in FIG. 1, according to a related art, a roof surface 20, a left surface 30, a right surface 40 and a floor surface 50 of a B-pillar 10 are connected respectively to a vehicle body through welding. In particular, the floor surface 50 includes various parts 50a, 50b, 50c and thus creating a complex procedure, increasing a weight of a vehicle, and requiring multiple parts to be welded thus causing the generation of stress (collected load) at the welding parts due to a long use of a vehicle (e.g., continued use). Further, when connecting an inner of a B-pillar and a side sill inner, there are regions where welding is impossible due to the limited welding gun passing apertures and thus the regions are connected using carbon dioxide ($CO_2$) welding and are ruptured when a side collision of a vehicle occurs. Accordingly, a B-pillar unit for a vehicle that does rupture by the welding parts even when a side collision of a vehicle occurs is required.

The description provided above as a related art of the present invention is merely for helping in understanding the background of the present invention and should not be construed as being included in the related art known by those skilled in the art.

SUMMARY

The present invention has been made in an effort to solve the above drawbacks and one object of the present invention is to provide a B-pillar unit for a vehicle which is not ruptured by a welding part even when a side collision of a vehicle occurs. In one aspect, the present invention provides a B-pillar unit for a vehicle that may include a B-pillar connected to a vehicle body and including a roof surface, a left surface, a right surface and a floor surface, and may be connected in a circular shape.

The B-pillar may be formed through a drawing process as one object and then bent to form the circular shape. Each end (e.g., the first and the second end) of the B-pillar may form a floor surface having an identical section to be overlapped to form the floor surface as a double bonding structure to reinforce rigidity thereof. The ends of the B-pillar may be connected using a bonding agent.

In particular, both ends of the B-pillar in a width direction may be bent to a predetermined extent to form a bending surface. The B-pillar may be bent at a floor side thereof to a predetermined extent to form an arch shape. Additionally, the B-pillar may be formed as a plurality of layers by laminating carbon fiber composite. An outer layer of the B-pillar may be laminated in a length direction of the B-pillar and an inner layer of the B-pillar may be laminated at a predetermined angle with respect to the length direction of the B-pillar. The B-pillar may also be formed as a plurality of layers by laminating the carbon fiber composite wherein a distribution of lamination angles may be symmetrical vertically in a width direction.

BRIEF DESCRIPTION OF THE DRAWINGS

The above and other features of the present invention will now be described in detail with reference to exemplary embodiments thereof illustrated by the accompanying drawings which are given hereinbelow by way of illustration only, and thus are not limitative of the present invention, and wherein.

Figure 1:
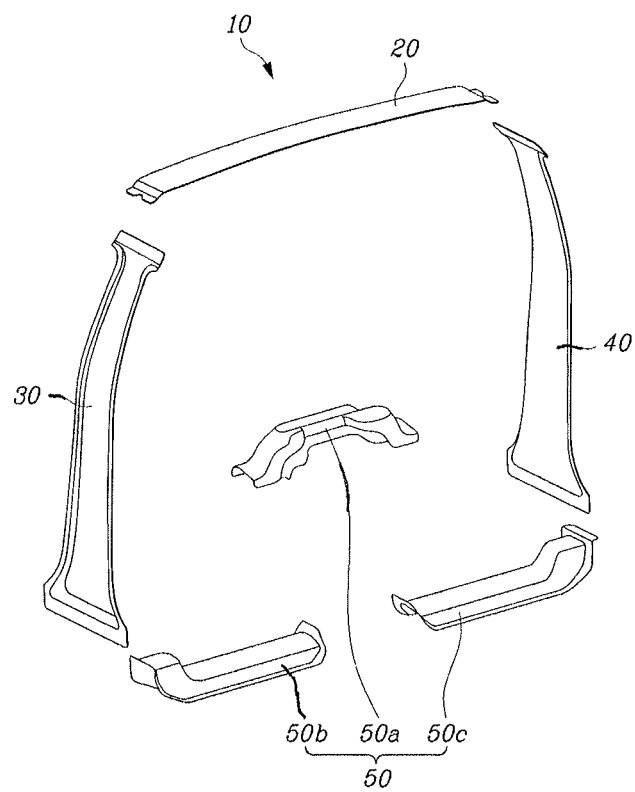
FIG. 1 is an exemplary view illustrating a B-pillar unit for a vehicle according to the related art.

It should be understood that the appended drawings are not necessarily to scale, presenting a somewhat simplified representation of various features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a B-pillar unit for a vehicle according to an exemplary embodiment of the present invention will be described with reference to the accompanying drawings.

Figure 2:
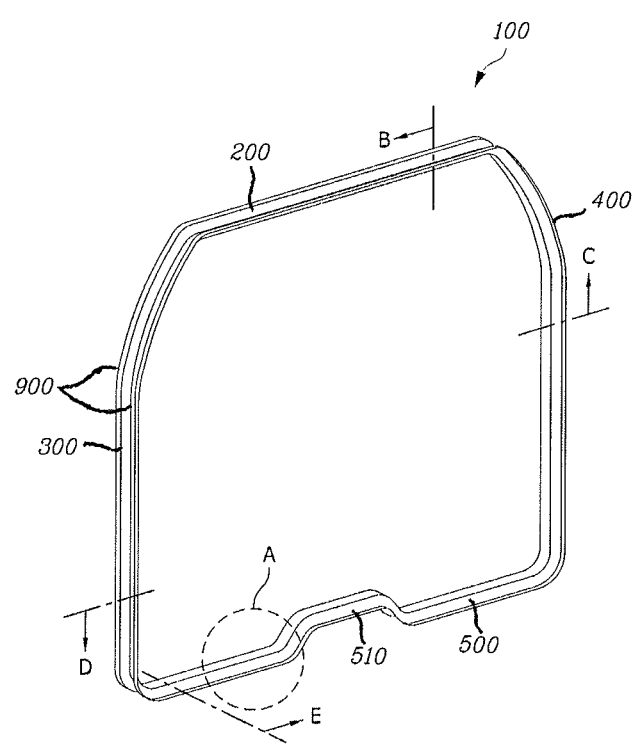
FIG. 2 is an exemplary view illustrating a B-pillar unit for a vehicle according to an exemplary embodiment of the present invention.
Figure 3:
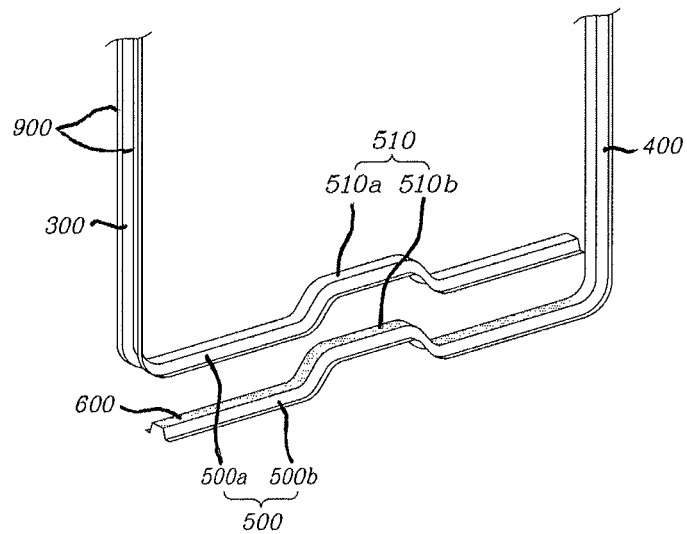
FIG. 3 is an exemplary view illustrating a connection part of a floor surface of the B-pillar unit for a vehicle as shown in FIG. 1 according to an exemplary embodiment of the present invention.
Figure 4:
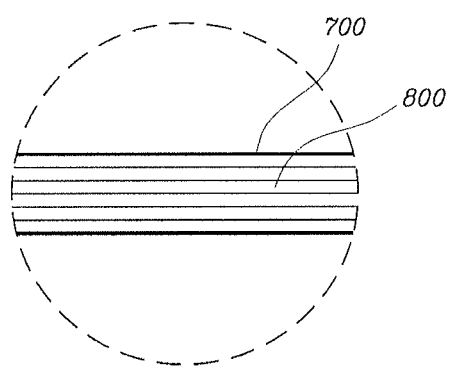
FIG. 4 is an exemplary detailed view illustrating "A" part of FIG. 2 according to an exemplary embodiment of the present invention.

FIG. 2 is an exemplary view illustrating a B-pillar unit for a vehicle according to an exemplary embodiment of the present invention, FIG. 3 is an exemplary view illustrating a connection part of a floor surface 500 of the B-pillar unit for a vehicle as shown in FIG. 1, and FIG. 4 is an exemplary detailed view illustrating "A" part of FIG. 2. A B-pillar unit for a vehicle according to an exemplary embodiment of the present invention may include a B-pillar 100 that may be connected to a vehicle body, include a roof surface 200, a left surface 300, a right surface 400 and a floor surface 500, and may be connected in a substantially circular shape (e.g., the various components of the B-pillar 110 may be connected in a substantially circular shape).

As shown in FIG. 1, according to a related art, a roof surface 20, a left surface 30, a right surface 40 and a floor surface 50 of a B-pillar 10 are connected respectively to a vehicle body through welding. Specially, the floor surface 50 includes multiple parts 50a, 50b, 50c thus complicating the assembly procedures, increasing a weight of a vehicle, and requiring multiple parts to be welded and causing the generation of stress (collected load) at the welding parts due to a continued use of a vehicle. Further, when connecting an inner of a B-pillar and a side sill inner part, there are regions where welding is impossible due to the limited welding gun passing apertures and thus the regions are connected using $CO_2$ welding and are ruptured when a side collision of a vehicle occurs.

Accordingly, the present invention has been proposed to solve above drawbacks through a B-pillar 100 having a circular structure in which a welding process is omitted.

The B-pillar 100 of the present invention may be formed through a drawing process as one object and then may be bent into a substantially circular shape. Specially, the B-pillar may be bent to form the floor surface 500 such that a first end 500a and a second end 500b thereof have about identical sections. Accordingly, the first end 500a and the second end 500b of the B-pillar 100 may be overlapped to form doubly the floor surface 500 (e.g., a double bonding structure) to reinforce rigidity of a vehicle body. Further, the first end 500a and the second end 500b of the B-pillar 500 may be connected by a bonding member 600 and thus may be connected without a separate welding process. Accordingly, the floor surface 500 may be formed as a double bonding structure to increase rigidity thereof and reinforce a lower structure of a vehicle body to ensure safety to a passenger.

In particular, as shown in FIGS. 2 and 3, a bending surface 900 may be formed on the B-pillar 100 to end both side ends of the B-pillar 100 in a width direction to a predetermined extent. The bending surface 900 may be formed on a whole B-pillar 100 to increase whole rigidity of the B-pillar 100. Further, an arch 510 may be formed on the floor surface 500 by bending the floor surface in a length direction to a predetermined extent (e.g., to form an arch shape). The arch 510 may increase rigidity of the floor surface 500 and simultaneously, a connection force between the ends of the B-pillar 100 may be increased when connected.

Further, when drawn-forming the B-pillar 100, reinforcement locations may be varied based on the starting point of the forming and thus, as shown in FIG. 2, when the "B" part is reinforced, a roof cross member may be reinforced, when the "C" part is reinforced, the roof cross member and an upper part of the B-pillar 100 may be reinforced, when the "D" part is reinforced, a lower part of the B-pillar 100 and a floor member may be reinforced, and when the "E" part is reinforced, the floor member may be reinforced to improve the rigidity of the B-pillar unit and ensure design flexibility.

The B-pillar 100 may be formed as a plurality of layers by laminating Carbon Fiber Reinforced Plastics (CFRP) wherein an outer layer 700 of the B-pillar 100 is laminated in a length direction of the B-pillar 100 and an inner layer 800 of the B-pillar 100 is laminated at a predetermined angle of about 5-85° with respect to a length direction of the B-pillar 100. Further, the B-pillar 100 may be formed as a plurality of layers by laminating the carbon fiber composite wherein a distribution of lamination angles may be symmetrical vertically in a width direction. For example, the carbon fiber composite may be laminated at angles of about 0°→90°→+45°→−45°→−45°→+45°→90°→0° in order from a lower layer (e.g., a bottommost layer) to an upper layer (e.g., a top layer) to improve and ensure the rigidity of the B-pillar 100. In particular, the carbon fiber composite may use Tansome H2550 as fiber and epoxy, polyurethane, nylon and polypropylene as resin.

Moreover, according to the B-pillar unit configured as described in the forgoing, the B-pillar may be formed as a substantially circular shape using carbon fiber composite to improve collision performance when a side collision of a vehicle occurs, thereby ensuring safety to passengers. Further, the carbon fiber composite may be formed using a drawing process to vary the reinforcement locations based on the starting points of the drawing forming and the weight of a vehicle may be reduced to improve fuel ratio.

Meanwhile, according to the B-pillar unit of the present invention, the B-pillar unit may be formed integrally through a drawing process of the carbon fiber composite to minimize the number of procedures and further bending surfaces may be formed by bending the carbon fiber composite to predetermined lengths at a width direction and a length direction of the B-pillar unit, respectively to improve the rigidity and connection force. Further, a welding part may be formed to remove collected load occurring at the welding part to improve durability.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A B-pillar unit for a vehicle, comprising:
   a B-pillar that is connected to a vehicle body,
   wherein the B-pillar includes a roof portion, a left portion, a right portion and a floor portion, and
   the B-pillar is formed as a single piece that is bent to form the roof portion, the left portion, the right portion, and the floor portion.

2. The B-pillar unit of claim 1, wherein the B-pillar is formed through a drawing process.

3. The B-pillar unit of claim 1, wherein a first part and a second part of the B-pillar form the floor portion upon being overlapped to reinforce rigidity thereof.

4. The B-pillar unit of claim 3, wherein the first part and the second part of the B-pillar are connected through a bonding agent.

5. The B-pillar unit of claim 3, wherein the first part and the second part of the B-pillar are bent to a predetermined extent.

6. The B-pillar unit of claim 1, wherein the floor portion of the B-pillar includes a portion that is bent to form an arch shape.

7. The B-pillar unit of claim 1, wherein the B-pillar is formed as a plurality of layers by laminating carbon fiber composite.

8. The B-pillar unit of claim 7, wherein an outer layer of the plurality of layers is laminated in a length direction of the B-pillar.

9. The B-pillar unit of claim 8, wherein an inner layer of the plurality of layers is laminated at a predetermined angle with respect to the length direction of the B-pillar.

10. The B-pillar unit of claim 7, wherein a distribution of lamination angles of the laminated carbon fiber composite is symmetrical vertically in a width direction.

* * * * *